US006986139B1

(12) United States Patent
Kubo

(10) Patent No.: US 6,986,139 B1
(45) Date of Patent: Jan. 10, 2006

(54) LOAD BALANCING METHOD AND SYSTEM BASED ON ESTIMATED ELONGATION RATES

(75) Inventor: Hidehito Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 867 days.

(21) Appl. No.: 09/680,517

(22) Filed: Oct. 6, 2000

(30) Foreign Application Priority Data

Oct. 6, 1999 (JP) ................... 11-285271

(51) Int. Cl.
G06F 9/46 (2006.01)
(52) U.S. Cl. ..................... 718/105; 709/223
(58) Field of Classification Search ................ 718/105; 709/223

See application file for complete search history.

(56) References Cited

U.S. PATENT DOCUMENTS

| 5,774,668 | A | * | 6/1998 | Choquier et al. | |
|---|---|---|---|---|---|
| 5,881,284 | A | * | 3/1999 | Kubo | 709/100 |
| 5,951,634 | A | * | 9/1999 | Sitbon et al. | 709/105 |
| 5,978,844 | A | * | 11/1999 | Tsuchiya et al. | 709/221 |
| 6,006,248 | A | * | 12/1999 | Nagae | 709/105 |
| 6,128,642 | A | * | 10/2000 | Doraswamy et al. | 709/201 |
| 6,377,975 | B1 | * | 4/2002 | Florman | 709/203 |
| 6,587,938 | B1 | * | 7/2003 | Eilert et al. | 712/29 |
| 6,665,716 | B1 | * | 12/2003 | Hirata et al. | 709/224 |

FOREIGN PATENT DOCUMENTS

| JP | S57-757 | 1/1982 |
|---|---|---|
| JP | H6-243112 | 9/1994 |
| JP | 7-302242 | 11/1995 |
| JP | H10-240697 A | 9/1996 |
| JP | H9-212467 A | 8/1997 |
| JP | 10-27168 | 1/1998 |
| JP | H10-11407 A | 1/1998 |
| JP | 10-312365 | 11/1998 |
| JP | H11-15799 A | 1/1999 |
| JP | H11-39340 A | 2/1999 |

OTHER PUBLICATIONS

Nariyoshi Yamai, "Design and Packaging of a Command Unit Load Distribution Function in UNIX," Journal of the Institute of Electronics, Information, and Communication Engineers, vol. J77-D-1, No. 7, pp. 483-492, The Institute of Electronics, Information, and Communication Engineers, Ltd, Jul. 25, 1994 (CS-NG-1998-01006-003).

(Continued)

Primary Examiner—Meng-Al T. An
Assistant Examiner—George L Opie
(74) Attorney, Agent, or Firm—Foley & Lardner LLP

(57) ABSTRACT

A dynamic load balancing method allowing a transaction processing load is balanced among computers by using estimated elongation rates is disclosed. In a system composed of a plurality of computers for processing transaction processing requests originating from a plurality of terminals, elongation rates of processing time for respective ones of the computers are estimated, where an elongation rate is a ratio of a processing time required for processing a transaction to a net processing time which is a sum of CPU time and an input/output time for processing the transaction. After calculating load indexes of respective ones of the computers based on the estimated elongation rates, a destination computer is selected from the computers based on the load indexes, wherein the destination computer having a minimum one among the load indexes.

30 Claims, 9 Drawing Sheets

OTHER PUBLICATIONS

Susumu Tsuruda, "Dynamic Distributed Processing Systems Using Load Forecasting, and the Evaluation Thereof," Research Reports of the Institute of Electronics, Information, and Communication Engineers, vol. 96, No. 95, pp. 25-32, COMP96-19, The Institute of Electronics Information, and Communications Engineers, Ltd., Jun. 14, 1996 (CS-NG-1998-00585-004).

Hisao Kameda et al., "Optical Load Balancing in Distributed Computer Systems", *Springer*, pp. 225-233, 1997.

* cited by examiner

FIG.3

| T1 | T2 | T3 | T4 | T5 | T6 | T7 |
|---|---|---|---|---|---|---|
| COMPUTER # | NUMBER OF CURRENT TRS | ESTIMATED NUMBER OF TRS | ESTIMATED NUMBER OF TRS/CPU-SYSTEM | ESTIMATED ELONGATION RATE | ESTIMATED ELONGATION RATE AFTER DISTRIBUTION | ESTIMATED LOAD |
| 1 | Np1 | Ne1 | Pe1 | Ep1 | En1 | Lxy1 |
| 2 | | | | | | |
| ... | ... | ... | ... | ... | ... | ... |
| i | Npi | Nei | Pei | Epi | Eni | Lxyi |
| ... | ... | ... | ... | ... | ... | ... |
| n | Npn | Nen | Pen | Epn | Enn | Lxyn | x=p/a/k   y=1/2/3

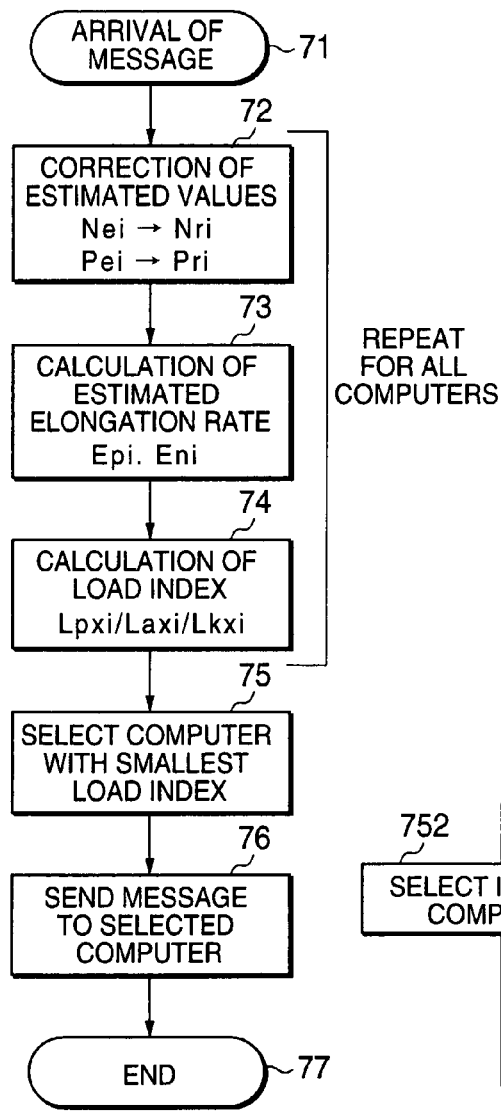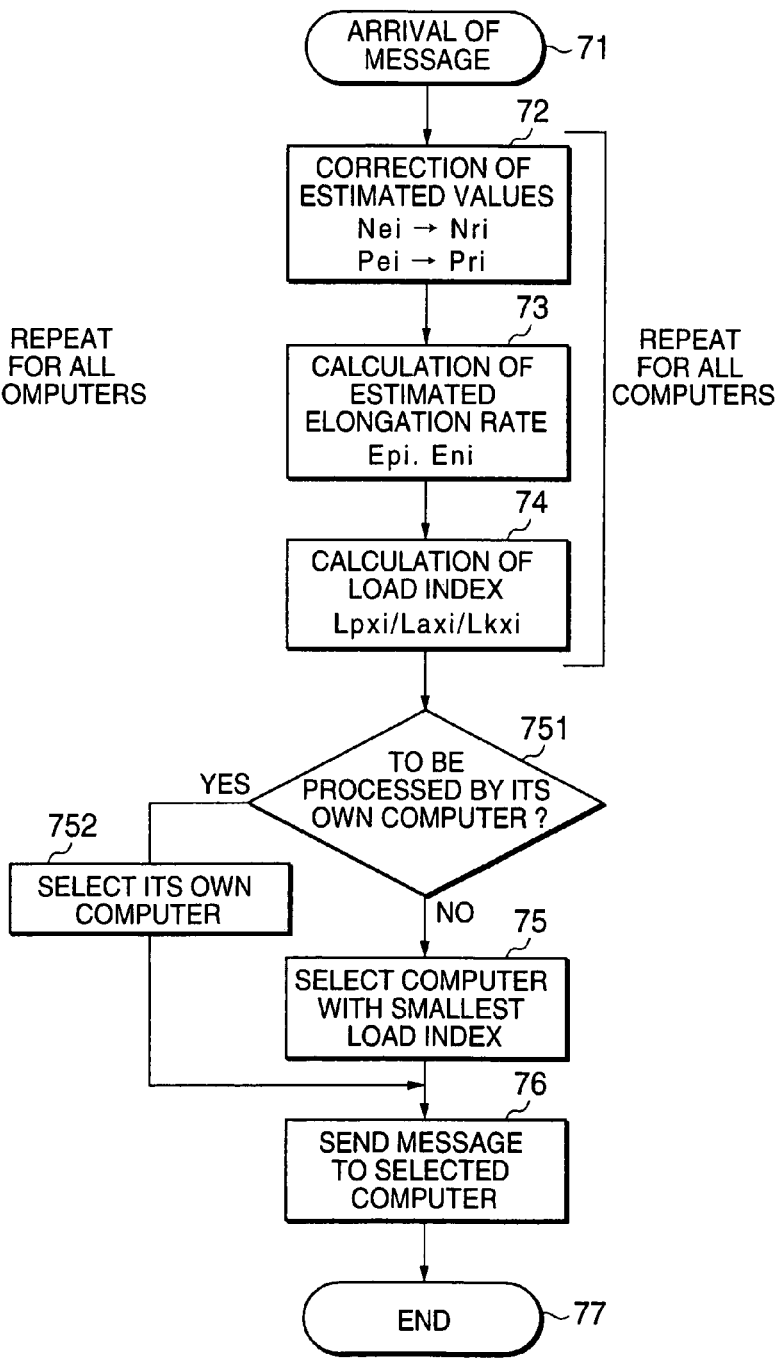

FIG.5

| ELONGATION RATE / LOAD INDEX | ESTIMATED ELONGATION RATE BEFORE SCHEDULING | ESTIMATED ELONGATION RATE AFTER SCHEDULING | |
|---|---|---|---|
| | | UNKNOWN CHARACTERISTICS | ESTIMATED CHARACTERISTICS |
| ELONGATION RATE AS IT IS | Lp1=Epi | La1=Eni | Lk1=Eki |
| ELONGATION RATE MULTIPLIED BY NUMBER OF TRANSACTIONS | Lp2=Nri × Epi | La2=Nni × Eni | Lk2=Nni × Eki |
| AN INCREASE IN TOTAL ELONGATION RATE | — | La3=La2 − Lp2 | Lk3=Lk2 − Lp2 |

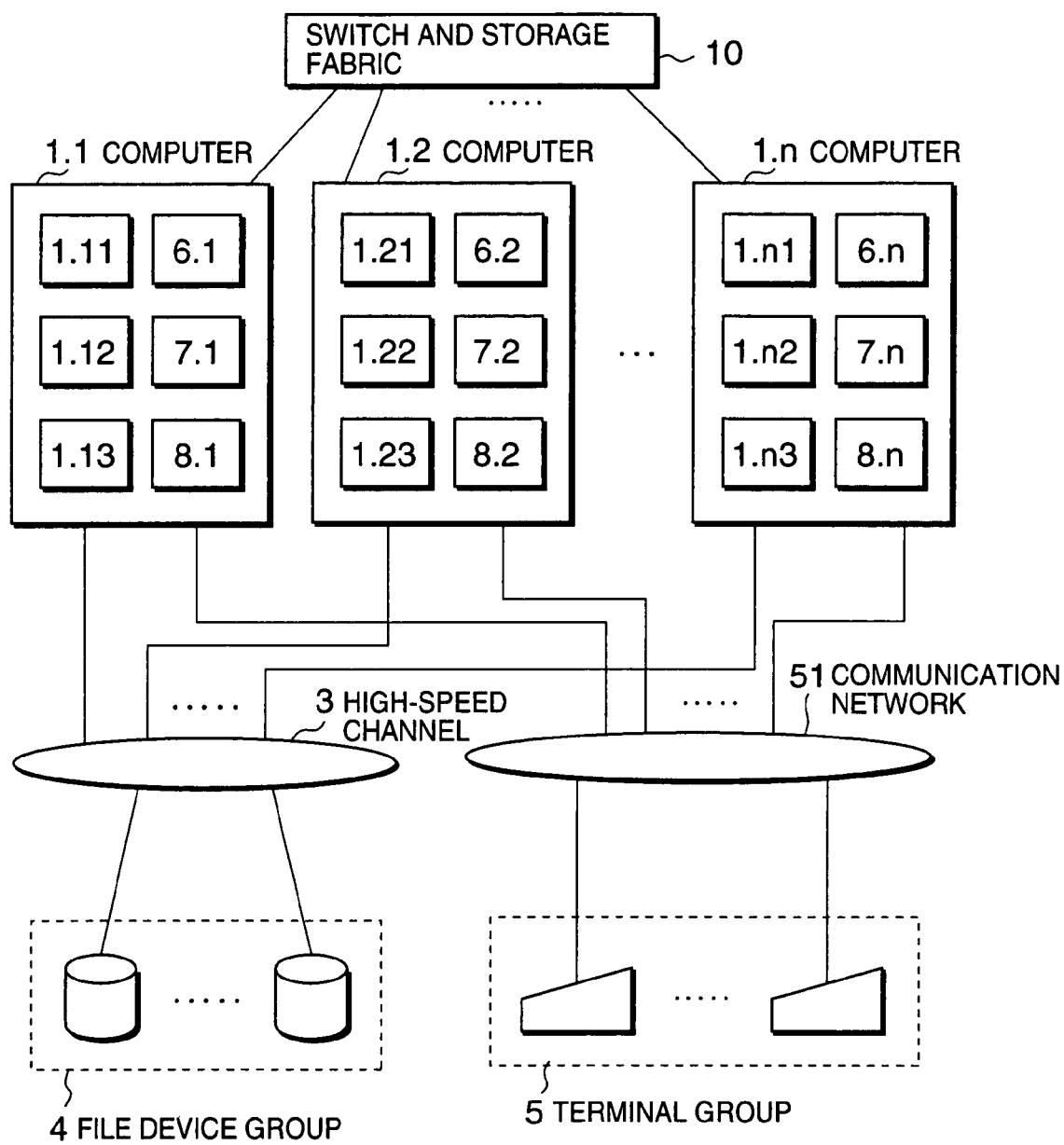

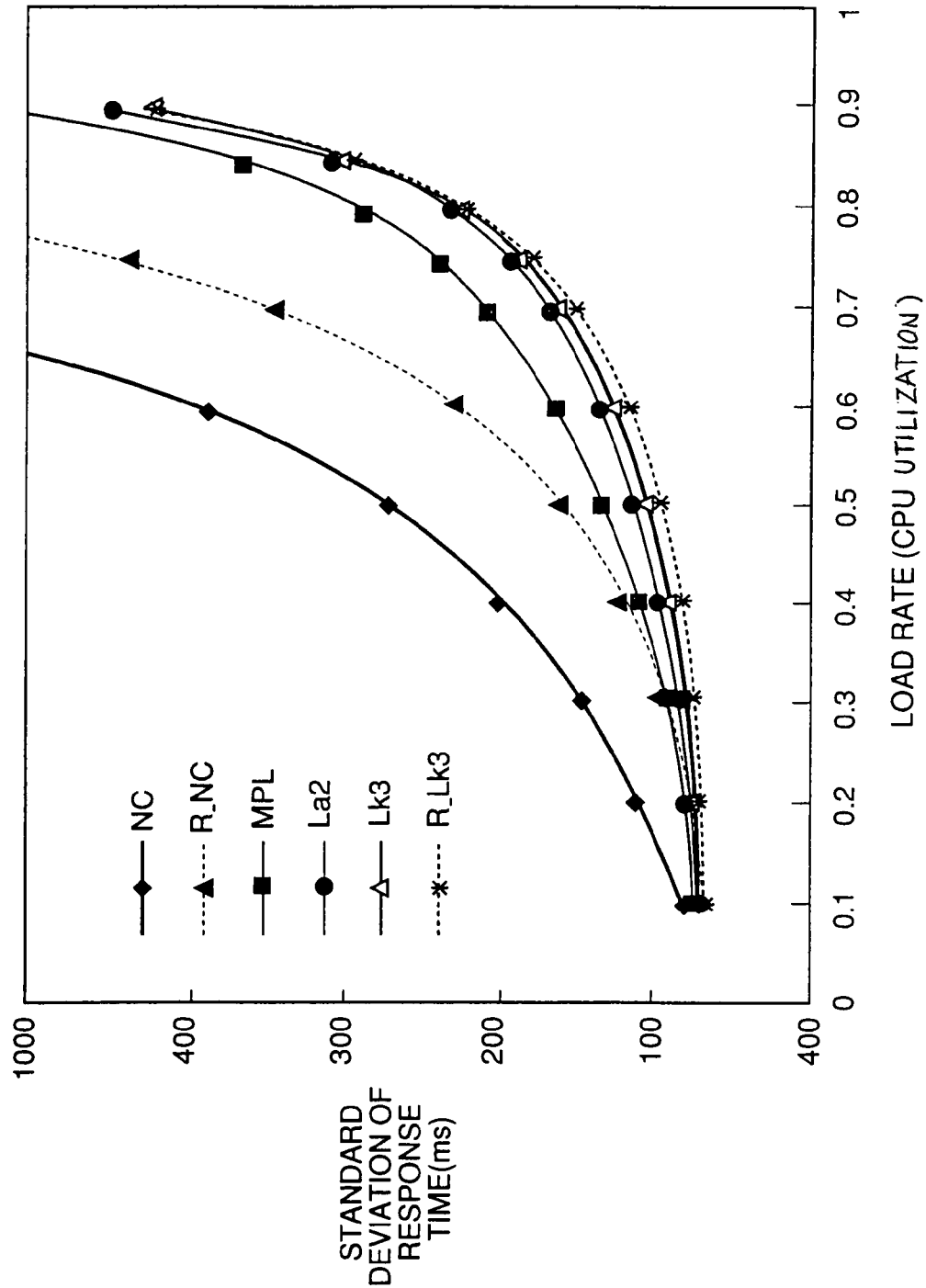

LOAD BALANCING METHOD AND SYSTEM BASED ON ESTIMATED ELONGATION RATES

BACKGROUND OF THE INVENTION

1. Field of the Invention

The present invention relates to a system for executing transaction processing by sharing load among a plurality of computers, nodes, or processors, that are connected to each other to form a relatively close group such as a cluster, and more particularly to a system and method for balancing transaction processing loads among the computers.

2. Description of the Related Art

In a system including a plurality of processing devices (computers), a load balancing method is designed to provide the maximum performance of the system by appropriately distributing a large number of successive arrivals of messages each requiring small-scale processing over these multiple computers. Since the processing required for each message is small in scale, a computer to execute the processing of a message is generally decided on arrival and the selected computer performs and finishes the processing without migrating it to another computer in progress.

Moreover, since the processing is interactive, the ultimate objective of load balancing is to minimize the mean and variation of response times. In general, when a message arrives, a computer with lightest load is selected as a computer to execute the processing of the message.

Here, what is to be selected as "load index" is very important. Conventionally, as load index, the CPU utilization of a computer, the number of processing jobs at a computer, records of response time in the resent past and the like have been used, individually and separately, or in combination.

A conventional example has been disclosed in Japanese Patent Application Unexamined Publication No. 10-312365 (hereafter, called Prior Art 1). Here, the load states (here, CPU utilizations) of servers (computers) are measured and stored at regular time intervals. Based on the stored load states, a server with lightest load is selected ms an executing computer that is put in charge of processing a new message. Beside, a terminal monitors the response time of processing at the server and, if the response time exceeds a predetermined value, then the terminal sends a path change request to change the executing computer to anther computer.

In this case, CPU utilization is used as a first load index. The CPU utilization is certainly a good index, but the measured value is a mean value of past certain time interval and does not contain the effect of start/termination of the following processing or the like, so it is not so reliable as index representing the "actual state". Particularly in the case of dynamic control, since the measured data at a time instant is used until the next measurement time, processing requests arriving meanwhile are sent intensively to a specific one server judged to be least loaded, resulting in seesawing load balancing.

As a second load index, the record of response time of processing in progress is used to determine whether the currently executing computer should be changed to another computer. The record of response time would be an effective index if the changeover of executing computer in progress were performed with a small overhead. However, it is impossible to use this index because there is no record of that processing itself when arriving.

Another conventional example has been disclosed in Japanese Patent Application Unexamined Publication No. 10-27168 (hereafter, called Prior Art 2). According to this conventional example, the processing time of the latest message is stored at each computer and is multiplied by the number of in-process messages on that computer to produce a load index value. When receiving a message, the load index values are calculated at all computers, and a computer with the smallest load index value is selected to process the message.

In this case, the problem is whether the processing time of the last processed message represents the processing times of messages on that computer. Such a processing time may reflect the congestion state of that computer and the job characteristics (net processing time, the ratio CPU use to I/O use time) of the last message processing. If the job characteristics are identical for all messages, they may be considered to give a yardstick as load index. However, in general situations where those of various job characteristics are mixed, there is a strong likelihood of misjudging if each processing time as it is reflects the load state.

Still another conventional example has been disclosed in Japanese Patent Application Unexamined Publication No. 7-302242 (hereafter, called Prior Art 3). Among many claims, a technique related to the present invention is described in claim 9 or paragraph Nos. 152 to 161 in the specification. Here, the load of a transaction processing section is detected periodically and the load history is memorized with the time. Then, the load trend Tr is calculated by the following expression:

$$Tr=(W2-W1)/(T2-T1).$$

In the case where a server has received a transaction processing request if it is judged that the processing load prediction value will not exceed a threshold value Wt after an elapse of time Ti, that is, $Tr \cdot Ti \leq Wt$, then the sever accepts the transaction processing request and, if not ($Tr \cdot Ti > Wt$), then the server refuses it or requests the processing of another server with lighter load. In this example, the load is detected periodically and the detected load is used to determine, but what is concretely defined as "load" is not specified clearly all through the whole Publication. Though the provision of load index is a first important step for load balancing, it is not done. Besides, it is attempted to predict the load after an elapse of Ti by extrapolating linearly the past (it is seemed insufficient by $Tr \cdot Ti$ but it is apart from that matter), but it does not seem to be a good prediction. This kind of macro prediction might be effective concerning the load of the whole system. However, the future load state of each server is decided by micro movement such as the actual state, in-process transaction termination timing, and whether it accepts or not new processing, so it is undesirable to extend the past trend and take it for granted as it is.

Either of the above-described Prior Arts 1, 2 and 3 decides the computer in charge of processing a new message aiming to minimize the processing time of the arrived message itself. However, there is not necessarily a guarantee that such individual optimization system is directly linked to the optimization of the whole system.

A still further conventional example has been described in pp. 225 to 232 of "Optimal Load Balancing in Distributed Computer Systems" (H. Kameda et al.) published by Springer, 1977 (hereafter, called Prior Art 4). Looking at one CPU, a premised node model may be shown in FIG. 2. An arrival job at a node repeats the use of CPU (computer i in FIG. 2) and disks, and leaves upon the termination of processing. The time required for this processing is the response time of the job. Since a plurality of jobs are processed in parallel, a queue is generated at the CPU. The other CPUs are provided similarly as the illustrated computer i, and all CPUs take the same access time for an access to any disks. Here, the following two expressions are shown as load index:

$$fi = si(ni+1)^2 \qquad (1); \text{ and}$$

$$Fi = si(ni+1) \qquad (2),$$

where, f and F are load indexes, i is a computer number, s is the mean net service time in CPU for jobs, and n is the number of jobs in the CPU system. These expressions are deduces as values the smaller the better so as to minimize the mean response time in a sense, based on a relation realized concerning mean values in the equilibrium state for a CPU system, in an open queuing network model proposed in the queuing theory. In fact, the expression (2) represents the mean time in a CPU system, and the mean response time is obtained by adding the mean time in the input/output system to that in the CPU system. It has been shown that that these are optimal in a sense as an index for static load balancing.

However, the advantage of dynamic control resides in the capability of control depending on the situation of that time, and it is meaningless for si and ni unless the actual value is used in place of mean value in the equilibrium state. The actual value of ni can be measured, however, si reflecting characteristics of job mix being executed on the computer i can not be measured directly. In the evaluation described in this paper, the mean value of the whole is used as si. The mean value of the whole may well be used if the processing to be executed is of single type from the viewpoint of job characteristics and, moreover, if the variation of job characteristics is narrow. However, the merit of dynamic control will mostly be lost by the use of the mean value of the whole, if it is of single type but the variation of job characteristics is wide, or in the case where multiple types of processing providing different characteristics are mixed, which appears much closer to reality.

A first problem of the prior arts is that the load state of each computer that is used to determine the load balancing cannot be sufficiently grasped. Conventionally, the number of in-process transactions, CPU utilization and the likes have been used respectively and individually or in combination as load index. However, it cannot be said that they reflect sufficiently the system congestion state, taking into consideration job characteristics including the CPU/input output use rate in a group of in-process transactions at that time.

In a system where a very large number of small scale processing requests arrive as in the case of transaction processing, it is necessary to exactly grasp the load state in a short time interval. However, the trend has been to reduce the collection frequency because the overhead of data collection increases in the distributed computer system. Besides a device to use good data of low overhead, it is required to make good use of clustered computer's capability to collect data with high speed/low overhead.

A second problem of the prior arts is that the system-wide optimization on average of response time and minimization of variations cannot be always obtained. An optimal computer that is expected to process the arrived transaction in the shortest time at that time is selected as a computer in charge of the processing. However, such an individual optimization scheme does not necessarily ensure the system-wide optimization.

SUMMARY OF THE INVENTION

An object of the present invention is to provide an effective load index serving as criterion for selecting an execution destination computer in charge of processing a processing request among a plurality of computers.

Another object of the present invention is to provide a low-overhead dynamic load balancing method capable of keeping the system-wide mean and variation of response times small by balancing the transaction processing load among the computers.

According to the present invention, a load balancing method in a system comprising a plurality of computers for processing transaction processing requests originating from a plurality of terminals, includes steps of; a) estimating load states of respective ones of the computers; b) determining estimated elongation rates of processing time for respective ones of the computers based on the estimated load states; c) calculating load indexes of respective ones of the computers from the estimated elongation rates; and d) determining load distribution among the computers based on the load indexes.

A load balancing method includes steps of; a) estimating elongation rates of processing time for respective ones of the computers, wherein an elongation rate is a ratio of a processing time required for processing a transaction to a net processing time which is a sum of CPU time and an input/output time for processing the transaction; b) calculating load indexes of respective ones of the computers based on the estimated elongation rates; and c) selecting a destination computer from the computers based on the load indexes, wherein the destination computer having a minimum one among the load indexes.

A load balancing system includes; a plurality of terminals, each of which originates a transaction processing request; a plurality of computers, each of which processes a plurality of transaction processing requests originating from a plurality of terminals in parallel; a load estimator for estimating load states of respective ones of the computers; a load data memory for storing the estimated load states; and an execution computer selector for selecting one of the computers as an execution computer to be put in charge of processing a transaction processing request based on load indexes of respective ones of the computers, wherein the load indexed are calculated from estimated elongation rates of processing time for respective ones of the computers, wherein the estimated elongation rates are determined based on the estimated load states.

An elongation rate of a processing time is defined as a ratio of the response time of a job processing process (a processing time including a queuing time) to the net processing time (total time actually using resources including CPU and file devices). In the case of all the computers providing the same processing speed, a processing process can be completed faster by a computer having a lower elongation rate and, therefore, the response time thereof can be reduced. An estimated elongation rate reflects program characteristics as group in operation (including not only the CPU use characteristic but also CPU-I/O use characteristic) in a job mix that is a group of processes in operation on the concerned computer.

The elongation rate of processing time in each computer is estimated based on measured load data obtained by measuring, at a certain time cycle, the number of in-process transactions and the number of job processing processes staying in the CPU system, or, the number of in-process transactions and the CPU utilization.

The load data of each of the computers may be measured at constant intervals to produce a sequence of load data. And a current load state of each of the computers may be estimated based on the sequence of load data.

The estimated load states may be corrected using the current numbers of in-process transactions for respective ones of the computers to produce corrected estimated load states, and estimated elongation rates of processing time for respective ones of the computers may be determined based on the corrected estimated current load states.

The estimated elongation rate may be used as a load index of each of the computers. The estimated elongation rate may be one of a before-scheduling estimated elongation rate and an after-scheduling estimated elongation rate, wherein the before-scheduling estimated elongation rate is an estimated elongation rate calculated from a corresponding estimated load state before the transaction processing request is allocated to respective ones of the computers, and wherein the after-scheduling estimated elongation rate is an estimated elongation rate calculated from a corresponding estimated load state after the transaction processing request is allocated to respective ones of the computers.

A load index of the computer may be determined such that the estimated elongation rate of each of the computers is multiplied by a current number of in-process transactions in the computer to produce a total estimated elongation rate of the computer, and the total estimated elongation-rate is determined as a load index of the computer.

A load index of the computer may be determined such that the estimated elongation rate of each of the computers is multiplied by a current number of in-process transactions in the computer to produce a total estimated elongation rate of the computer, a total estimated elongation rate difference between an after-scheduling total estimated elongation rate and a before-scheduling total estimated elongation rate of each of the computers is calculated, and the total estimated elongation rate difference is determined as a load index of the computer.

According to another aspect of the present invention, a load balancing method in a system comprising a load balancing device for distributing transaction processing requests originating from a plurality of terminals to a plurality of execution computers, includes steps oft at the load balancing device, a) receiving load data from each of the execution computers at regular intervals, the load data including a number of in-process transactions and one of a CPU utilization and a number of job processing processes staying in a CPU system of the execution computer; b) estimating load states of respective ones of the computers based on load data received from the execution computers; c) determining estimated elongation rates of processing time for respective ones of the computers based on the estimated load states; d) calculating load indexes of respective ones of the computers from the estimated elongation rates; and e) determining load distribution among the computers based on the load indexes.

According to further another aspect of the present invention, a load balancing method includes steps of: at each of the computers, a) estimating a load state of the computer based on load data measured at regular intervals including a number of in-process transactions and one of a CPU utilization and a number of job processing processes staying in a CPU system of the computer; b) storing the load state of the computer and a load state received from another computer in a load state memory; c) transferring the load state of the computer to all other computers; d) when receiving a transaction processing request from a terminal, determining estimated elongation rates of processing time for respective ones of the computers based on the load states stored in the load state memory; e) calculating load indexes of respective ones of the computers from the estimated elongation rates; f) determining based on the load indexes whether the transaction processing request should be processed by the computer or transferred to another computer; g) when it is determined that the transaction processing request should be transferred to another computer, determining a destination computer among the computers based on the load indexes to transfer it to the destination computer; and h) when it is determined that the transaction processing request should be processed by the computer, processing the transaction processing request.

According to still another aspect of the present invention, a load balancing method includes steps of:
at the interim load balancing device, a) setting a predetermined distribution scheme; b) when receiving a transaction processing request from a terminal, selecting an interim destination execution computer from the execution computers according to the predetermined distribution scheme; c) sending the transaction processing request to the interim destination execution computer;
at each of the execution computers, d) estimating a load state of the execution computer based on load data measured at regular intervals including a number of in-process transactions and one of a CPU utilization and a number of job processing processes staying in a CPU system of the execution computer; e) storing the load state of the execution computer and a load state received from another execution computer in a load state memory; f) transferring the load state of the execution computer to all other execution computers; g) when receiving the transaction processing request from the interim load balancing device, determining estimated elongation rates of processing time for respective ones of the execution computers based on the load states stored in the load state memory; h) calculating load indexes of respective ones of the execution computers from the estimated elongation rates; i) determining based on the load indexed whether the transaction processing request should be processed by the execution computer or transferred to another execution computer; j) when it is determined that the transaction processing request should be transferred to another execution computer, determining a final destination computer among the execution computers based on the load indexes to transfer it to the final destination computer; and k) when it is determined that the transaction processing request should be processed by the execution computer, processing the transaction processing request.

The predetermined distribution scheme may be a static distribution method such that the terminals are previously divided into a plurality of groups and an interim destination execution computer is determined depending on which one of the groups a request originating terminal belongs to.

The predetermined distribution scheme may be a static round distribution method such that the execution computers are sequentially and repeatedly selected as an interim destination execution computer in the arrival order.

The predetermined distribution scheme may be a quasi-static method such that after receiving load data from each of the execution computers at regular intervals, the load data including a number of in-process transactions and one of a CPU utilization and a number of job processing processes staying in a CPU system of the execution computer, the predetermined distribution scheme is determined based on the load data so that a transaction processing load is balanced among the execution computers.

BRIEF DESCRIPTION OF THE DRAWINGS

FIG. 3 is a diagram showing a table of data used for calculating the value of load index;

FIG. 4A is a flow chart showing the operation of an execution computer selector in the first embodiment;

FIG. 4B is a flow chart showing the operation of an execution computer selector in a transaction load balancing system according to a second or third embodiment of the present invention;

FIG. 5 is a diagram a table of eight kinds of load used in the present invention;

FIG. 6 is a block diagram showing the configuration of a transaction load balancing system according to the second embodiment of the present invention;

FIG. 9 is a graph showing a standard deviation of response time, which is a result of simulation.

DESCRIPTION OF THE PREFERRED EMBODIMENTS

First Embodiment 1.1 System configuration

Figure 1:
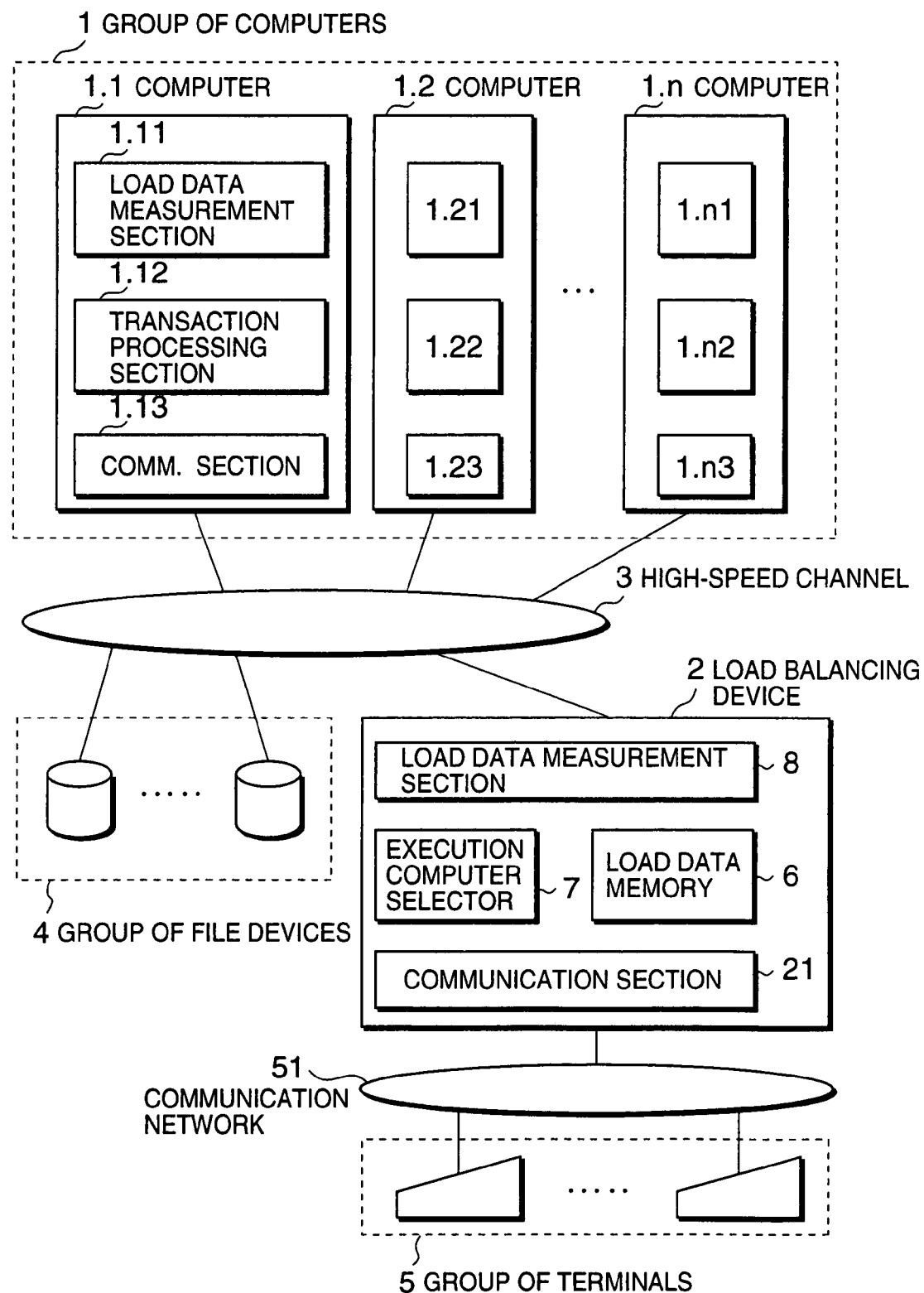
FIG. 1 is a block diagram showing the configuration of a transaction load balancing system according to a first embodiment of the present invention.

Referring to FIG. 1, a computer group 1 is composed of n computers 1.1 through 1.$n$ (generally denoted by 1.$x$), each of which is a program-controlled computer. The computer group 1 is connected to a load balancing device 2 and a file device group 4 through a high-speed channel 3. The load balancing device 2 is further connected to a terminal group 5 through a communication network 51.

In the computer group 1, a computer 1.$x$ (x=1, 2, . . . , or n) includes a load data measurement section 1.$x$1, a transaction processing section 1.$x$2, and a communication section 1.$x$3. The transaction processing section 1.$x$2 includes a plurality of job processing processes (not shown).

The load balancing device 2 includes a communication section 21, a load data memory 6, an execution computer selector 7, and a load data measurement section 8. The computers 1.1 to 1.$n$ do not share a main memory but the file device group 4 via the high-speed channel 3 with equivalent performance conditions.

A single transaction is processed as follows. A terminal device belonging to the terminal group 5 transmits a message, which is a transaction processing request to the load balancing device 2 via the communication network 51. The load balancing device 2 selects one of the computers 1.1 through 1.$n$ as a computer in charge of processing the received message. Assuming that the selected computer is denoted by a general reference numeral 1.$i$ (i=1, 2, . . . , n), the load balancing device 2 sends the message to the selected computer 1.$i$ via the high speed channel 3. The selected computer 1.$i$, when receiving the message, executes the transaction processing thereof, produces a response message, and sends it back to the request-originating terminal device through the high-speed channel 3, the load balancing device 2, and the communication network 51 in reverse.

Here, load data measurement section 1.$x$1, transaction processing section 1.$x$2 and communication section 1.$x$3 provided on a computer 1.$x$ are each implemented by programs stored in machine readable recoding media such as CD-ROM, magnetic disk, semiconductor memory, or the like (not shown), the respective programs running on each computer 1.$x$ to implement them when the computer group 1 is started up or at other moments.

Similarly, the communication section 21, the load data memory 6, execution computer selector 7, and the load data measurement section 8 provided on the load balancing device 2 are implemented by programs stored in machine readable recoding media such as CD-ROM, magnetic disk, semiconductor memory, or the like (not shown), the respective programs running on a computer of the load balancing device 2 to implement them when the computer is started up or at other moments.

Since the computers 1.1 to 1.$n$ have the same function, they will be represented by a computer 1.$i$ (i=1, 2, . . . , n). The load data measurement section 1.$i$1 on the computer 1.$i$ periodically measures load data of the computer 1.$i$ thereof, and sends the measured load data to the load balancing device 2. Upon the reception of processing request message received from the load balancing device 2 through the communication section 1.$i$3, the transaction processing section 1.$i$2 allocates the received processing request to the job processing process under its own control so that the requested processing is performed. The job processing process repeatedly uses the CPU and accesses files on the file device group 4 to execute the program, produces a response message when the processing is terminated, and sends it to the load balancing device 2 via the communication section 1.$i$3.

The load data measurement section 8 periodically receives the load data from the respective computers 1.1 through 1.$n$ via the communication section 21, processes the received load data to produce estimated load data, and stores it to the load data memory 6. On the other hand, the load data measurement section 8 receives notification of occurrence of a transaction processing request and an arrival of a response message from the communication section 21, and updates a part of data on the load data memory 6.

The execution computer selector 7 receives a transaction processing request message via the communication section 21 and calculates an estimated elongation rate for each computer 1.$i$ using the estimated load data of the computers stored in the load data memory 6. Based on the estimated elongation rate for each computer, the execution computer selector 7 selects from the computers 1.1–1.$n$ an execution computer to be put in charge of processing the received transaction processing request. When the execution computer has been determined, the execution computer selector 7 instructs the communication section 21 to send the transaction processing request message to the selected computer through the high-speed channel 3.

1.2 Operation

Now, an operation of the first embodiment will be described in detail referring to FIGS. 1–5.

In FIG. 1, upon the reception of a transaction processing request message from the load balancing device 2 through the communication section 1.i3, the transaction processing section 1.i2 allocates the transaction processing request to the job processing process under its own control, and makes it execute the transaction processing depending on the request. The transaction processing section 1.i2 is capable of processing a plurality of transactions, that is, a plurality of job processing processes on multiprogramming state, and thus improves the response time and the use efficiency of resources. A job processing process repeatedly uses the CPU and gains access to the file device group 4 to execute a corresponding job program. When terminating the processing, the transaction processing section 1.i2 sends the response message to the load balancing device 2 through the communication section 1.i3, and then terminates the process.

The resource use characteristic of a job processing process can be determined by the CPU time and the number of input/output accesses, but it is different from one transaction to another. Since pluralities of processes are made to run in parallel, they may access the same resource concurrently. Therefore, it is supposed that a process queue will be formed at least in front of the CPU. In general, the higher the CPU utilization, the longer the queue. As for the input/output, all the computers originating an access request have the same performance condition and therefore it is supposed that the processing time including queuing time is not different among the computers.

Figure 2:
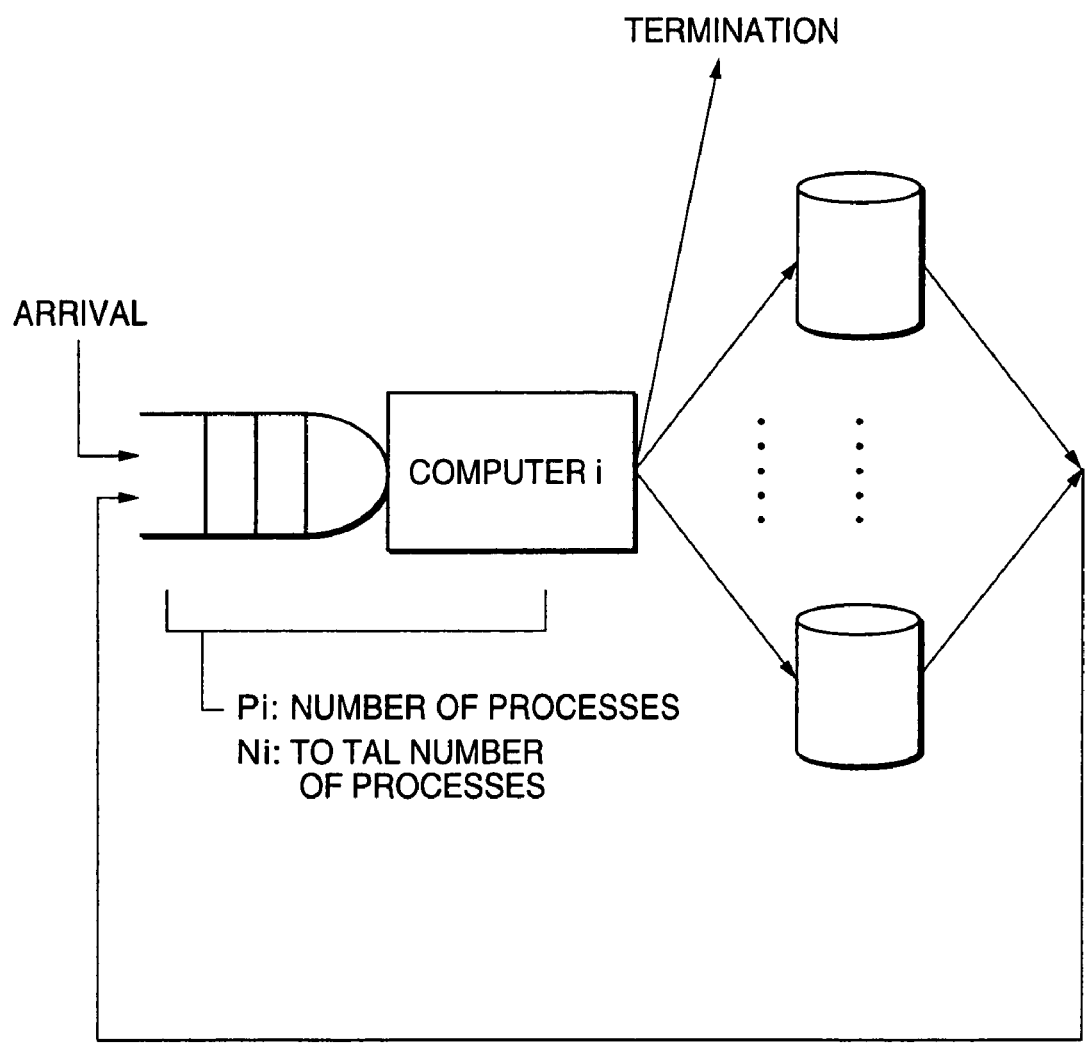
FIG. 2 is a diagram showing a system model for any one computer i.

Referring to FIG. 2, it is assumed that Ni represents the number of in-process job processing processes on the computer i. It corresponds to the number of transactions being processed on said computer. It is further assumed that Pi represents the number of job processing processes in the CPU system, and so, Pi is smaller than or equal to Ni. It is the total number of job processing processes running on the CPU and processes waiting for CPU allocation (ready state). Since the file device group 4 is shared among all the computers and the access performance is equal for all computers, all the computers are supposed to have the same performance as the computer i.

The load data measurement section 1.i1 on the computer 1.i measures periodically the number of job processing processes, Pi, staying in the CPU system at that moment or the CPU utilization, Ri, from the previous measurement timing to the current measurement timing, and the number of in-process job processing processes, Ni, at that moment. The load data measurement section 1.i1 sends the measured data. Pi/Ri and Ni, as periodically measured load data, to the load balancing device 2 via the communication section 1.i3. Taking into consideration accuracy/overhead tradeoffs because the measurement interval has an effect on the load balancing accuracy, the measurement interval is preferably about 100 milliseconds or less and, further preferably about 10 milliseconds, for an ordinary transaction processing. Which one of Pi and Ri is used may be decided for each execution system. Here, the case where Pi is used is called P method, and the case where Ri is used is called R method.

Referring to FIG. 3, a computer number T1 shows the identification of a computer operating in the system, and a computer is managed based on data contained in a row of the table. The load data measurement section 8 periodically receives, via the communication section 21, values of the number of job processing processes Pi in the CPU system or the CPU utilization Ri from the previous measurement timing to the current measurement timing and the number of in-process job processing processes Ni at that moment, from the load data measurement section 1.i1. Then, the load data measurement section 8 processes the received data, Pi/Ri and Ni, to produce the estimated value Pei of Pi or the estimated value Rei of Ri and the estimated value Nei of Ni as estimated load data. In the case of the R method, Pei can be calculated from Rei. The Pei is stored in the column T4 and the Nei is stored in the column T3 for the computer number i.

The number of current in-process transactions, Npi, is stored in the column T2 for the computer number i of the table. This value Npi is updated and stored in the table by the load data measurement section 8 when notified of transmission of a transaction processing request (transaction start) and arrival of a response message (transaction termination) from the communication section 21. Therefore, the value Npi is a reliable measured value.

1.3 Estimated Value Calculation

The measured values are not used as they are but converted into estimated values in order to compensate for low sampling reliability by comprehensively integrating the past data.

More specifically, an estimated value is obtained using the following relation. Assuming that m is a measured value, e is an estimated value, and n is the times of measurements:

$$e(n)=a \cdot m(n)+(1-a) \cdot e(n-1) \qquad (3),$$

where a is a parameter ($0<a \leqq 1$) and the initial value e(0) is equal to e(1). In other words, the current-evaluated value e(n) is the sum of the current measured value m(n) multiplied by parameter a and the previous estimated value e(n-1) multiplied by (1-a). The expression (3) can be expanded as follows:

$$e(n)=a \cdot m(n)+(1-a) \cdot m(n-1)+a(1-a)^2 \cdot m(n-2)+a(1-a)^3 \cdot m(n-3)+-.$$

This expanded expression shows that the estimated value e(n) includes all past measured values m(n), m(n-1), —such that more importance is given to a more recent measured value. That is, the larger the parameter a (nearer to 1), the more important a later measured value. If the measurement interval is enough short, then the reliability of an estimated value increases by making the parameter a smaller (for example, a=0.1).

In the R method, Pei is calculated from Rei-determined by the expression (3) by the following formula, and stored in the row T4.

$$Pei=Rei/(1.0-Rei),$$

$$Pei=Nei \text{ when } Rei \geqq 0.99.$$

This expression is nothing but the relation between a system length and utilization in M/M/1 queue.

1.4 Selection of Execution Computer

Referring to FIG. 4A, when a processing request message has arrived at the load balancing device 2 from a terminal (step 71), the execution computer selector 7 is started up by the communication section 21 and receives the processing request message from the communication section 21. Then, the execution computer selector 7 determines the estimated elongation rate of each computer from the load data of the computer stored in the load data memory 6 (steps 72 and 73) and calculates the value of a load index for each computer (step 74). Based on the load indexes of the computers, the execution computer selector 7 selects an execution computer with the smallest load index from the computers (step 75), and instructs the communication section 21 to send the processing request message to the selected computer (step 76).

1.4.1 Correction of Estimated Value

In the estimated value correction step 72 of FIG. 4A, the correction is made based on data stored in the load data memory 6. More specifically, the corrected number of in-process job processing processes, Nri, and the corrected number of job processing processes existing in the CPU system, Pri, as current load data of a computer i, are calculated by the following formulas:

$$Nri = w \cdot Npi + (1-w) \cdot Nei \qquad (4),$$

where w is a weighing coefficient (w≦1.0) and is preferably about 0.8; and $$Pri = Pei + (Nri - Nei), \text{ when } Nri \geq Nei = Pei + (Nri/Nei),$$
$$\text{when } Nri < Nei \qquad (5),$$

The expression (5) corrects Pei estimated from the past sampling data using the relation between Nei estimated under the same conditions as this and Nri that is the most reliable corrected value representing the actual state. In this manner, a corrected value near the current true value can be obtained from the latest estimated value, based on the estimation that is carried out only at certain time intervals.

1.4.2 Calculation of Estimated Elongation Rate

In the estimated elongation rate calculation step 73, the estimated elongation rate Bpi is determined from the next formula;

$$Epi = X/(X - Pri \cdot Pri), \text{ when } Pri < Nri, = Nri + 1.0, \text{ when } Pri \geq Nri \qquad (6),$$

$$\text{where } X = Nri \cdot (Pri + 1).$$

The estimated elongation rate Epi is stored in the column T5 of the table as shown in FIG. 3.

The expression 6 is deduced from the relation established concerning the mean value of equilibrium states in one computer (one CPU) as shown in FIG. 2. The details will be described hereafter.

It is assumed that transaction processing request messages arrive at a time interval following an exponential distribution, that is, according to a Poisson process. In addition, it is assumed that no queue will occur for disk device, that is, an infinite number of disk devices exist. Here, the number of in-process job processing processes, the number of job processing processes in the CPU system among them, and the CPU utilization are also assumed to be mean values, and all variables including them are shown with computer numbers and suffixes indicating estimated states omitted. For example, the number of in-process job processing processes is denoted by N, the number of job processing processes existing in the CPU system by P, the CPU utilization by R, and so on. Moreover, four kinds of symbols defined below are denoted with mean time per transaction:

F: processing time;
t: net processing time;
s; CPU use time; and
d; input/output time (t=s+t).

Further, the mean number of input/output being executed at the request from the object computer are denoted by D(N=P+D).

Referring to an expression (8.3) described in page 228 of the Prior Art 4, concerning mean values in equilibrium states, $$F = s(P+1) + d = sP + t \qquad (6.1)$$

and since there is no queue for input/output, $$d/s = D/R \qquad (6.2)$$

In addition, as known from the comparison of the expression (8.3) and an expression (8.1) described in page 228 of the Prior Art 4, $$P + 1 = 1/(1-R),$$

therefore, $$R = P/(1+P) \qquad (6.3).$$

Substituting the expression (6.3) into the expression (6.2), using d=t−s and N=P+D, $$s = Pt/(P+D+PD) = Pt/(N(P+1) - P \cdot P) \qquad (6.4).$$

Further, substituting the expression (6.4) into the expression (6.1), $$F = P \cdot Pt/(N(P+1) - P \cdot P) + t = N(P+1)t/(N(P+1) - P \cdot P) = Xt/(X - P \cdot P)$$

wherein, X=N(P+1).

Therefore, the expression (6) of elongation rate E is deduced as follows:

$$E = F/t = X/(X - P \cdot P).$$

The elongation rate E may also be represented using N and the CPU utilization R as follows:

$$E = N(1-R)/(N(1-R) - R \cdot R) \qquad (6.5).$$

The expression (6.5) can be obtained by applying the expression (6.3) representing the relation of R and P to the expression (6), or by using the expression (6.2) and the expression (6.3) starting from the expression (8.1) (representing the processing time by using R) described in the Prior Art 4 (the description of deduction is omitted). However, as for R, since it seems that there is no correction means corresponding to the one performed by the expression (5), the present embodiment converts R into P and corrects the converted P. Even when the CPU utilization is measured in this embodiment, the expression (6) using N and P is used as the definitive elongation rate expression.

Here, the expression (6) used to determine an estimated elongation rate in this embodiment is established in the case of the statistic equilibrium state of a system as described above, and if the equilibrium state continues for a certain time, the elongation rate can be estimated knowing the mean values of P and N during the time of the equilibrium state. Nei and Pei obtained from the expression (3) based on the history are considered to be used as the equilibrium mean values representing the actual state. However, as for N, an exact current value Npi is known. To reflect this in the position of dynamic load balancing, so in the aforementioned expression (4), the corrected value of N is obtained based on this principle.

1.4.3 Calculation of Predicted Elongation Rate

Depending on a load index to be adopted, in addition to the actual estimated elongation rate Epi, a predicted elongation rate Eni is required in the case where an arrival message is scheduled for a computer i. There may be required only Eni. As in the case of Epi, Eni is also calculated in the stop 73 of FIG. 4A.

If a predicted elongation rate Eni is required and the job characteristics of processing of an arrival message is not used, then Eni is calculated same as the expression (6), assuming that the number of transactions Nni after scheduling is Nri+w and the number of processes staying at the CPU is Pri+w. The calculated Eni is stored in the column T6 of the table as shown in FIG. 3.

If job characteristics of processing of an arrival message can be estimated and is used, then the proportion C of CPU time to its net processing time (sum of time actually using resources such as CPU and file devices, in other words, processing time without resource conflict) is estimated depending on the kind of message or others. The Pni is estimated using the estimated proportion C according to the following calculation steps.

Assuming that $C_1$ is an estimated value of C of the job mix on the computer i before scheduling, the estimated value $C_1$ corresponds to s/t in the expression (6.4), applying the corrected values of N and P to the expression (6.4), $$C_1 = Pri/(Nri \cdot (1+Pri) - Pri \cdot Pir)$$

Assuming that $C_2$ is an estimated value of C of the new job mix in the case where an arrival message of $C=C_0$ is scheduled, Nri jobs having a mean value of $C_1$ exist, and one job having a mean value of $C_0$ is added thereto and the sum becomes Nni. Therefore, their mean becomes, $$C_2 = (Nri \cdot C_1 + C_0)/Nni.$$

From the expression (6.4), since $s/t = P/(NP+N-P \cdot P)$, applying this expression to the state after scheduling, and substituting Pni by y, because of $s/t - C_2$, the following relation is obtained:

$$C_2(Nni \cdot y + Nni - y^2) = y.$$

Arranging this relation, the following quadratic equation is obtained:

$$C_2 y^2 + (1 - C_2 \cdot Nni)y - C_2 \cdot Nni = 0 \qquad (7).$$

By solving the equation (7) for y, an estimated value of Pni after scheduling can be obtained. Since the constant term is negative, both a positive solution and a negative solution are obtained. The positive solution is adopted as Pni. Then, Eni is calculated similarly to the expression (6) (referred to as Eki, hereinafter).

1.4.4 Elongation Rate

The elongation rate of a processing time is defined as a ratio of the response time of a job processing process (a processing time including a queuing time) to the net processing time. An elongation rate Ei is a job processing process elongation rate at a computer i. In the case of all the computers providing the same processing speed, a processing process can be completed faster by a computer having a lower elongation rate and, therefore, the response time thereof can be reduced. An estimated elongation rate reflects program characteristics as group in operation (including not only the CPU use characteristic but also CPU-I/O use characteristic) in a job mix that is a group of processes in operation on the concerned computer. Moreover, there is a feature that the expression (6) is allowed to obtain an estimated elongation rate from only measurable data in operation without characteristics of individual jobs in operation. Although such a concept basically belongs to that of the Prior Art 4 and the expression 6 can be obtained by extending and transforming the expression 2, the present system can reflect the actual system state (job mix characteristics) and, moreover, improves the accuracy and dynamics by taking into consideration the total processing time (response time) including not only the time in the CPU system but also in the input/output devices. However, since the expression (6) is established based on a theory concerning balanced mean values, it cannot be said that a short-term state is estimated with 100% reliability.

1.4.5 Calculation of Load Index

At the step 74 of FIG. 4A, the value of load index for each computer is calculated using the load data stored in T2 to T6.

As shown in FIG. 5, eight kinds of load index, Lp1, Lp2, La1–La3, and Lk1–Lk3, can be conceived. In an actual system, one kind may be chosen among them. The value of load index is obtained using a corresponding expression described in a table as shown in FIG. 5, and the result is stored as estimated load in the column T7 of the table of FIG. 3. A computer with a smaller load index is more preferable as a destination computer.

For the possible timing of load to be considered, there are timings before scheduling and after scheduling of an arrival message. A load index to be used before scheduling is denoted by "Lp". If it is after-scheduling timing, two cases are considered depending on whether the job characteristics of the arrival message are unknown (a load index is denoted by "La") or are able to be estimated (a load index is denoted by "Lk").

For each of these three cases, the elongation rate itself can be taken as load index (denoted as "Lx1"), or the estimated elongation rate multiplied by the number of in-process job processing processes Nri/Nni can also be taken as load index (denoted as "Lx2"), wherein x is p, a, or k. The latter denoted as "Lx2" means total sum of estimated elongation rates of individual transactions on the computer i.

Further, from the viewpoint of load increase due to scheduling, it is possible to take an increment of the total sum before and after scheduling as load index (denote by "Lx3"). The selection of smallest increment of elongation rate leads to the selection of smallest increase of the system-wide total sum of response times due to the scheduling, resulting in that the minimization of overall mean response time can be expected. If the job characteristics of an arrival message can be estimated with a good considerable precision, then the adoption of Lk3, based on theory, allows expecting the best results. If good precision of job characteristics estimation can not be expected, the selection of Lk3 is not preferable, and it is better to adopt La2 from the point of smallest mean response time.

The correction of estimated value (step 72), the calculation of estimated elongation rate (step 73) and the load index calculation (step 74) are repeatedly performed for all computers that can process the arrival message. The estimated load indexes obtained by repeating the steps 72–74 are stored in the column T7 of the table as shown in FIG. 3.

1.4.6 Decision of Destination Computer

At the step 75 in FIG. 4A, the column T7 of the table as shown in FIG. 3 storing the estimated load indexes of the computers is searched for the smallest estimated load. A computer with the smallest estimated load is selected as the destination computer to be put in charge of processing the arrival message. Then, the execution computer selector 7 instructs the communication section 21 to send the arrival message to the selected computer i, which is prompted to start the processing.

1.5 Advantages

The first embodiment as described above provides the centralized load balancing control. More specifically, according to the first embodiment, the load balancing device 2 manages the load data of all the computers in real time and receives all processing request messages directly from terminals. When receiving a processing request message, the load balancing device 2 calculates the elongation rates and load indexes of the computers based on the previously received load data thereof and selects a computer with the smallest load index value as a destination computer to request the selected computer to process the processing request message. In this manner, the centralized load balancing control can be implemented, resulting in improved load balancing with reduced overhead.

Second Embodiment

Now, a second embodiment of the present invention will be described in detail.

2.1 System Configuration

Referring to FIG. 6, the second embodiment of the present invention is different, as for the composition, from the first embodiment in that the terminal devices of the terminal group 5 are connected directly to the computers 1.1 through 1.$n$ via the communication network 51 without the load balancing device 2 and that a switch and storage fabric 10 is connected to the computers 1.1 through 1.$n$.

Since the load balancing device 2 is removed, a computer 1.$i$ includes a load data memory 6.$i$, an execution computer selector 7.$i$ and load data measurement section 8.$i$ in addition to the load data measurement section 1.$i$1, the transaction processing section 1.$i$2 and the communication section 1.$i$3. These respective sections may be realized by running respective ones of programs stored in a recoding media (not shown) as in the first embodiment.

A single transaction is processed as described below. A transaction processing request message addressed to a certain computer is sent from a terminal device belonging to the terminal group 5, and is received by the computer via the communication network 51. The computer, when receiving the transaction processing request message, determines whether to process that message by itself or to transfer it to another computer. When determined to transfer it to another computer, it is further determined which one of the other computers is to be selected as a destination computer. When the destination computer is determined, the arrival transaction processing request message is transferred to the destination computer through the switch and storage fabric 10. The destination computer to be put in charge of processing the message executes the transaction processing of the request, produces a response message, and sends it back to the request originating terminal.

More specifically, the load data measurement section 1.$i$1 on the computer 1.$i$ periodically measures the load of the computer 1.$i$ and the measured load data is processed by the load data measurement section 8.$i$. The processed load data is stored as estimated data in the load data memory 6.$i$, and at the same time, sends the estimated data to all other computers through the switch and storage fabric 10. Moreover, the computers exchange notifications of the start and termination of transaction processing with each other via the switch and storage fabric 10. In this manner, the latest load data of all computers are stored in the load data memory 6.$i$ of each computer.

The execution computer selector 7.$i$ receives a processing request message from a terminal and calculates the estimated elongation rate of each computer using estimated load data stored in the load data memory 6.$i$. Based on the estimated elongation rates of the computers, as described before, the execution computer selector 7.$i$ determines an execution computer to be put in charge of processing the processing request message received from the terminal.

If it is determined that the computer i is put in charge of processing the processing request message, then the processing request message is transferred to the transaction processing section 1.$i$2. If it is determined that another computer x is put in charge of processing the processing request message, then the processing request message is sent to the destination computer x via the switch and storage fabric 10. When the computer x has received the processing request message, the transaction processing section 1.$x$2 allocates the job processing process under its own control to the received processing request message, and performs the processing. The job processing process repeatedly uses the CPU and accesses the files on the file device group 4 for program execution, produces a response message when the processing is terminated, and sends it to the request originating terminal through the communication network 51.

2.2 Operation

Next, an operation of the second embodiment will be described in detail.

In FIG. 6, the operation of the transaction processing section 1.$i$2 is the same as that of the first embodiment except that a processing request message is received directly from a terminal or from the other computer. Load data to be managed is also the same as that of the first embodiment as shown in FIG. 3, and the load data for all computers are retained in the load data memory 6.$i$ on each computer i. The load data measurement section 1.$i$1 on the computer 1.$i$ measures periodically, as load data of the computer 1.$i$, the number of job processes, Pi, in the CPU system or the CPU utilization Ri, and the number of in process job processing processes. Ni, at that moment. Then the load data measurement section 8.$i$ processes them, determines Pei or Rei and Nei as estimated data, calculates Pei from Rei in the case of the R method, and stores Nei in the column T3 and Pei in the column T4 for a computer number i. At the same time, values of Nei and Pei are sent to all other computers via the switch and storage fabric 10 and the contents of the load data memory 6.$x$ are updated. The calculation method of estimated data is identical to that of the first embodiment.

Besides, the load data measurement section 8.$i$ updates the actual number of in-process transactions Npi on the computer 1.$i$ (stored in column T2 in the table of FIG. 3) upon the reception of notification of transaction processing start and transaction processing termination on the computer 1.$i$ from the transaction processing section 1$i$2 and, at the same time, sends it to all other computers through the switch and storage fabric 10 so as to make all the other computers update the contents of the load data memory 6.$x$.

2.3 Selection of Execution Computer

Referring to FIG. 4B, the execution computer selector 7.$i$ is started on the computer 1.$i$ at which a processing request message arrives from a terminal (step 71). The execution computer selector 7.$i$ calculates an estimated elongation rate of each computer from the load data of the computers stored in the load data memory 6.$i$ (steps 72 and 73) and then calculates the value of load index (step 74) as described before.

Thereafter, the execution computer selector 7.$i$ determines based on the load indexes whether the arrival message is to be processed by its own computer 1.$i$ (step 751). If it is determined that it is not to be processed by its own computer (NO at step 751), then a destination computer with smallest load index is selected as an execution computer (step 75), and then the message is sent to the destination computer through the switch and storage fabric 10 so as to make the destination computer perform the processing (step 76). If it is determined that it is to be processed by its own computer (YES at step 751), then the execution computer selector 7.*i* selects itself (step 752) and performs the processing (step 76).

The correction of estimated value (step 72), the calculation of estimated elongation rate (step 73) and the load index calculation (step 74) are repeatedly performed for all computers that are able to process the arrived message. The estimated load indexes obtained by repeating the steps 72–74 are stored in the column T7 of the table as shown in FIG. 3.

The execution computer selector 7.*x* according to the second embodiment is different from the first embodiment in the decision step 751 and the self-selection step 752. At the decision step 751, it is determined whether an actual estimated elongation rate Epi of its own computer is equal to or lower than a predetermined threshold (preferably it is relatively small of the order of 1.3). If it is equal to or lower than the predetermined threshold, then it is determined that the arrival message is processed by its own computer.

Otherwise, when the estimated load of its own computer is not the smallest one among the computers, in other words, another computer with smallest estimated load exists in the column T7 of the table stored in the load data memory 6.*i*, if the difference between the estimated load of its own computer and the smallest estimated load of the other computer is sufficiently small, then it is determined that the arrival message is processed by its own computer. The judgment of difference magnitude depends on the predetermined threshold.

In the case where any of six kinds other than the increment of total sum of elongation rates is adopted as load index, it is preferable that the difference judgment relies on the multiple threshold, preferably, 1.3 to about 1.5. For example, if Epi of its own computer is equal to or lower than 1.3-times Epj of a computer j with smallest Ep, then it is determined that the arrival message is processed by its own computer.

In the case where the increment of total sum of elongation rates is adopted as load index, it is preferable to judge whether the difference of load indexes between two computers divided by the number of all transactions in the system exceeds the predetermined threshold. In other words, the judgment depends on the magnitude of increment of mean elongation rate of all transactions in execution. In this case, the threshold is preferably about 0.02. Here, the threshold is preferably high if the load measurement interval is long. The reason is that it is preferable to select a safe side where transaction transfers are less frequent because the estimated value is less reliable if the measurement interval is long.

In this embodiment, the processing execution by the origin computer at which the message arrived from the terminal is privileged because the transfer to another computer charges overhead to both the source and destination computers, and brings delay to the processing time of the object transaction itself. If the decision step using the predetermined threshold is removed, then almost all arrival transaction processing messages are most likely to be transferred to another computer.

If it is determined that the arrival message is processed by its own computer (YES at step 751), the arrival message is transferred to the transaction processing section 1.*i*2, so that the message is processed. If it is determined that the arrival message is not processed by its own computer (NO at step 751), the column T7 of the table as shown in FIG. 3 storing the estimated load indexes of the computers is searched for the smallest estimated load. A computer j with the smallest estimated load is selected as the destination computer to be put in charge of processing the arrival message. Then, the execution computer selector 7.*i* instructs the communication section 1.*i*3 to send the arrival message to the selected computer j to prompt the transaction processing section 1.*j*2 of the selected computer j to prompt to start the processing.

As described above, the load data memory 6.*x* of the computers 1.*x* has the identical contents, and each of the computers measures and calculates load data concerning itself and then sends its own load data to all other computers through the switch and storage fabric 10. However, if the switch and storage fabric 10 is provided with a sufficient capacity storage device as fast as main memory, then a part of the load data stored in the load data memory 6.*x* may also be stored and held on the switch and storage fabric 10 to allow the load data to be shared by the whole system. From the viewpoint of load data updating overhead, this composition is more preferable.

For example, the data stored in the columns T1 to T4 of the table as shown in FIG. 3 are held by the switch and storage fabric 10, and each computer may calculate estimated elongation rate, estimated load, or the like based on data extracted from the switch and storage fabric 10, and decide an execution computer to execute the processing.

Moreover, if it is determined that the arrival message is processed by another computer, it may also be so composed to store the arrival message in the switch and storage fabric and send only a request notification to the destination computer in place of sending the message itself directly. In this case, the destination computer can take the message itself out from the switch and storage fabric 10 at its convenience asynchronous to the request notification.

2.4 Advantages

According to the second embodiment, there is no need of the load balancing device 2 as shown in FIG. 1. Therefore, the whole system can be composed at low cost. Although load balancing according to the centralized control is impossible, a relatively high performance in load balancing can be achieved under the distributed control by calculating the elongation rate at a computer at which a processing request arrived from a terminal based on the load state data obtained by this computer and the other computers, selecting an execution computer at that moment considering also the transfer overhead, and executing the processing of the arrival message on the selected computer.

Figure 8:
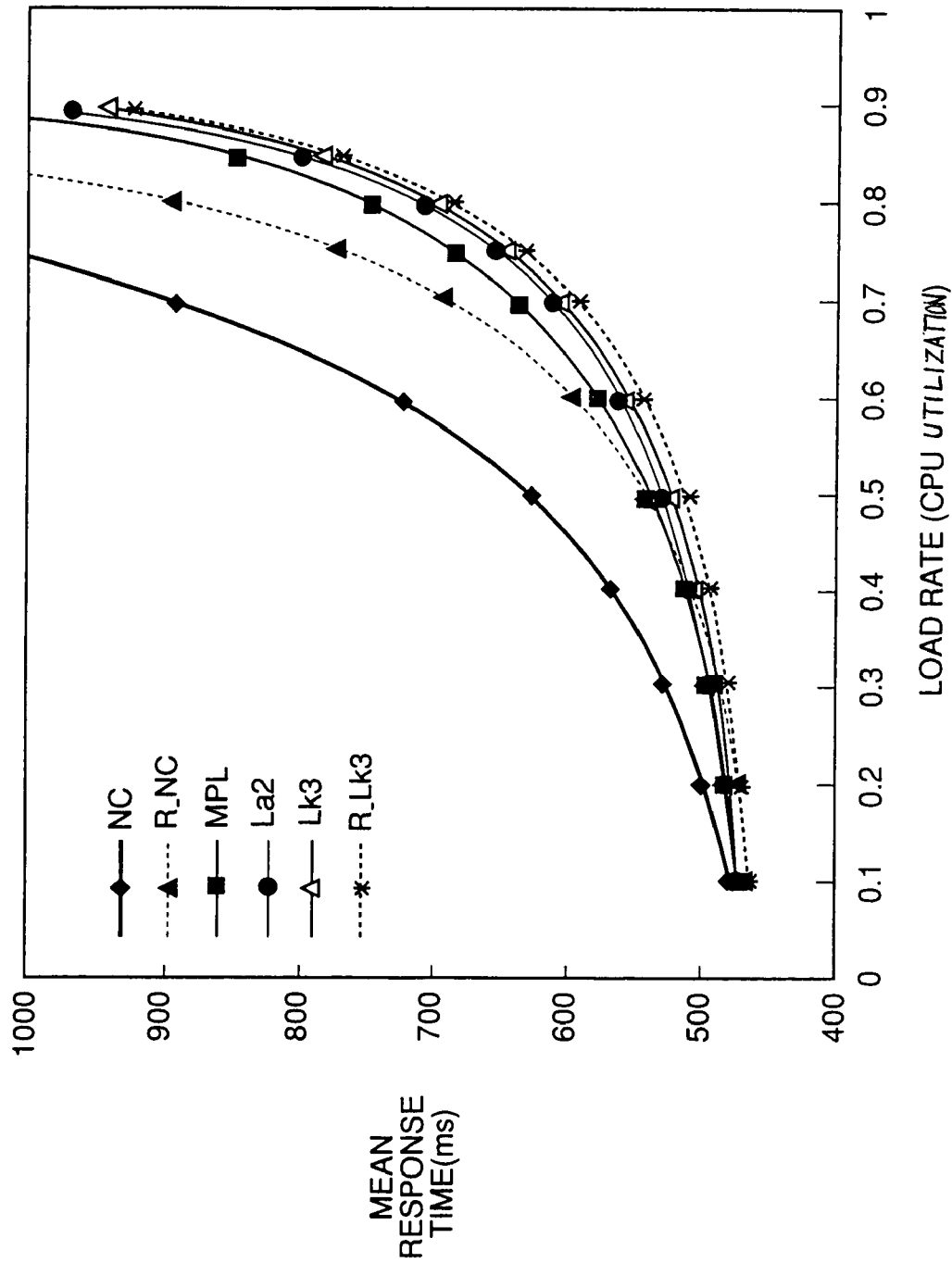
FIG. 8 is a graph showing the mean response time, which is a result of simulation.

Graphs as shown in FIGS. 8 and 9 are simulation results of the effect of load balancing under the distributed control according to the second embodiment. Here, assuming two kinds of transaction, one whose proportion of CPU time to the net processing time (450 milliseconds) is 5% on average and the other 60% on average, the arrival proportion between 5%-CPU-time transactions and 60%-CPU-time transactions is 7:3. It is further assumed that eight computers are provided, at which transactions randomly arrive, resulting in an equal arrival rate on average at each computer.

The horizontal axis of FIG. 8 indicates a load rate in proportion to the arrival rate and the vertical axis thereof indicates a mean response time (millisecond). The horizontal axis of FIG. 9 indicates a load rate in proportion to the arrival rate and the vertical axis thereof indicates variations in response times (standard deviation).

Respective curbs in FIGS. 8 and 9 correspond to load balancing methods, in which ones shown by solid lines are associated with the second embodiment and other ones shown by dotted lines with a third embodiment as described later. NC method processes arrival transactions without load balancing. MPL method is dynamic load balancing control taking the actual number of in-process transactions as a load index. In the MPL method, if there is a computer having a load index smaller than that of the arrival computer by 2 or more, then the arrival transaction is transferred to the computer having the smallest load index, in which the transaction is processed. La2 and Lk3 correspond to the dynamic load balancing control using the load index based on the estimated elongation rate according to the second embodiment. These results teach that, concerning the mean response time, the dynamic control is significantly better than the NC method which is optimal for static stochastic load balancing and particularly show that the method based on the estimated elongation rate is more excellent than methods based on the number of in-process transactions used in the prior art, and further teach that the similar trend is more remarkably in variations in the response time. Such an advantage of the second embodiment is brought to the fore when the load rate is high.

Third Embodiment

A third embodiment of the present invention will be described in detail with reference to FIGS. 7–9.

3.1 System Configuration

Figure 7:
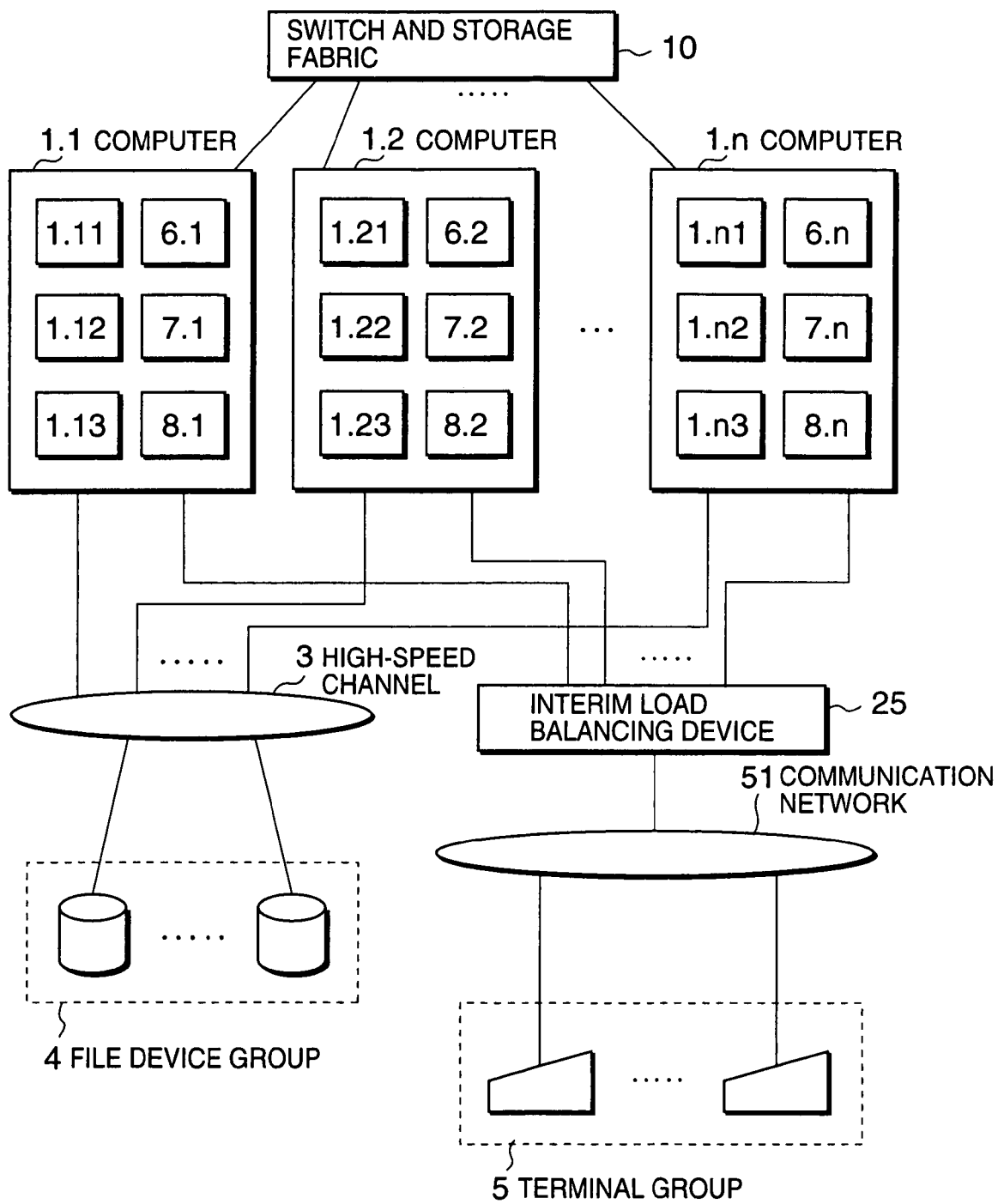
FIG. 7 is a block diagram showing the configuration of a transaction load balancing system according to the third embodiment of the present invention.

As shown in FIG. 7, the third embodiment of the present invention is different in system configuration from the second embodiment. In the third embodiment, an interim load balancing device 25 is provided, through which the terminal group 5 is connected to each of the computers 1.1–1.n.

A single transaction is processed as described below. A transaction processing, request message is sent from a terminal device belonging to the terminal group 5, and is received by the interim load balancing device 25 via the communication network 51. The interim load balancing device 25, when receiving the transaction processing request message, determines an interim destination computer according to static/quasi-static decision scheme or without using dynamic information in the dynamic load balancing control. The details of the static/quasi-static decision scheme will be described later.

When the interim destination computer is determined, the interim load balancing device 25 sends the arrival message to the interim destination computer. When receiving the message from the interim load balancing device 25, the computer determines whether to process that message by itself or to transfer it to another computer. When determined to transfer it to another computer, it is further determined which one of the other computers is to be selected as a final destination computer. When the final destination computer is determined, the arrival transaction processing request message is transferred to the final destination computer through the switch and storage fabric 10. The final destination computer to be put in charge of processing the message executes the transaction processing of the request, produces a response message, and sends it back to the request originating terminal through the interim load balancing device 25.

3.2 Interim Load Balancing

Similarly to the load balancing device 2 of the first embodiment (see FIG. 1), the interim load balancing device 25 receives all processing request messages from the terminal group 5, determines an interim destination computer according to the static/quasi-static interim load balancing scheme, and sends an arrival message to the interim destination computer. Three kinds of static/quasi-static interim load balancing scheme are supposed as follows:
1) Distribution based on terminal grouping;
2) Round distribution in the arrival order; and
3) Stochastic distribution based on past data.

Among the three methods, one or more is selected or combined. Other load balancing methods achieving a reduced collection of load data of computers and a low execution overhead may be adopted.

(1) Distribution Based on Terminal Grouping:

In the distribution based on terminal grouping, an interim destination computer is fixedly determined depending on which group a message-originating terminal belongs to. More specifically, the terminal group 5 is previously divided into a plurality of subgroups each associated with the computers 1.1–1.n. For example, a message originating from a first subgroup is processed by the computer 1.1, a message originating from a second subgroup is processed by the computer 1.2, and so on. In this way, an interim destination is uniquely decided according to a message-originating subgroup. Although this method is almost same as the second embodiment, this method can intensively manage a correspondence between the terminal subgroups and the computers at the interim load balancing device 25 and therefore it is easy to revise the grouping for better load balance in the long term, for example, at each system start-up, based on past data.

(2) Round Distribution in the Arrival Order:

In the round distribution in the arrival order, for example, the message arriving first at the interim load balancing device 25 is distributed to the computer 1.1, and the next to the computer 1.2, and so on. A message following the message distributed to the last computer 1.n is distributed again to the first computer 1.1, thus going round. Particularly, in the case where job characteristics of most of messages belong to the same class, the load balancing effect can be also expected even in the short term.

(3) Stochastic Distribution Based on Past Data:

In the stochastic distribution based on past data, the proportion of the number of messages to be distributed is set for each computer, and this distribution proportion is kept even in the short term. Load data is received periodically from each computer, such as every 1 sec or 10 sec, and if loads are imbalanced, then the distribution proportion to individual computers is increased/reduced to balance, and thereafter, the distribution is performed based on this updated distribution proportion.

The operations of the transaction processing section 1.x2 and the contents of the load data memory 6.x on the computer 1.x as shown in FIG. 7 are the same as those in the second embodiment. The load data measurement section 1.x1 and the load data measurement section 8.x on the computer 1.x also operate as in the case of the second embodiment. However, in addition to that, the load data measurement section 8.x sends the summary of load data to the interim load balancing device 25 at intervals of 1 sec, 10 sec or others, in the case where the interim load balancing device 25 adopts the aforementioned distribution method (3). The operation of the execution computer selector 7.x of the third embodiment is the same as in the second embodiment, and is illustrated by the flow chart of FIG. 4B.

As described above, the load data memory 6.x of the computers 1.x h as the identical contents, and each of the computers measures and calculates load data concerning itself and then sends its own load data to all other computers through the switch and storage fabric 10. However, if the switch and storage fabric 10 is provided with a sufficient capacity storage device as fast as main memory, then a part of the load data stored in the load data memory 6.x may also be stored and held on the switch and storage fabric 10 to allow the load data to be shared by the system. From the viewpoint of load data updating overhead, this composition is more preferable.

Moreover, if it is determined that the arrival message is processed by another computer, it may also be so composed to store the arrival message in the switch and storage fabric and send only a request notification to the destination computer in place of sending the message itself directly. In this case, the destination computer can take the message itself out from the switch and storage fabric 10 at its convenience asynchronous to the request notification.

3.3 Advantages

According to the third embodiment, the interim load balancing device 25 has a relatively simple function as described above. Therefore, the amount of data to be collected from the computers and the data collection frequency can be reduced, resulting in improved utilization efficiency of the network and further reduction in cost.

Furthermore, the interim destination computer is determined and then the arrival message is transferred to the interim destination computer. Accordingly, the response performance such as mean and variations can be improved and the message transfer frequency from the interim destination computer to a final destination computer can be substantially reduced, compared with the case where the interim load balancing device 25 is not provided.

As shown in FIGS. 8 and 9, respective curbs shown by dotted lines are associated with the third embodiment. In R_NC method, the round distribution in the arrival order (2) is performed as interim load balancing and thereafter the interim destination computer processes arrival transactions without load balancing. In R_Lk3 method, the round distribution in the arrival order (2) is performed as interim load balancing and thereafter the interim destination computer performs the dynamic load balancing control taking Lk3 in FIG. 5 the actual number of in-process transactions as a load index.

These results teach that the quasi-static load balancing control significantly improve the response performance, compared with the static load balancing NC method and particularly show that a combination of the quasi-static load balancing method and the method using the estimated elongation rate further improves the response performance, compared with the second embodiment.

ADVANTAGES OF INVENTION

According to the present invention, the dynamic distribution of processing requests is performed using a novel load index obtained from the elongation rate of computer processing time. In other words, the processing time elongation rate, as a basic performance index, reflects the program characteristics (including not only CPU characteristics but also CPU-I/O use characteristics) as a group of in-operation processes in a job mix. Therefore, as basic performance idex, the processing time elongation rate is most suitable for interactive processing and has a wide applicability. Accordingly, the improved load balancing among computers can be achieved even in the short term, and the mean and variation of response times can be kept small as the whole.

Moreover, according to the present invention, the load balancing can be realized based on the elongation rate of computer processing time, which can be obtained from only data observable during operation, such as the number of in-process transactions at each computer at certain time intervals, the number of job processing processes staying in the CPU system, and the CPU utilization. Therefore, the elongation time-based load balancing control can be achieved using only the observable load data with reduced overhead without apriori knowledge concerning job characteristics of individual processing requests.

Additionally, the load state of each computer is estimated using comprehensively a series of load data measured periodically. The current number of in-process transactions at each computer can be grasped at all times according to the transaction processing start/end notification of the computer. Since the estimated load data is corrected using this current number of in-process transactions, the estimation precision of estimated load can be increased. Consequently, the elongation rate estimation accuracy and the load balancing accuracy can further be improved.

Further, the load index of each computer can use the following data; the estimated elongation rate itself; the total estimated elongation rate before or after allocating a newly arrived transaction to a computer (the estimated elongation rate of processing time in the concerned computer multiplied by the number of in-process transactions at the concerned computer); or the difference between the total estimated elongation rate after allocating the arrival transaction to the concerned computer and the total estimated elongation rate before the allocation. Accordingly, the load can be balanced based on a load index representing load level of individual computers or of the whole system, and not only the minimization of processing time of individual transactions themselves but also the optimization of whole the system taking into consideration the effect of that allocation on the others can be realized.

The present invention can be equally applicable to a system designed to distribute intensively and dynamically individual processing requests to the computers or to a system designed such that, after the static/quasi-static load balancing control, an interim destination computer can perform the processing by itself or transfer the processing request message to another computer with lighter load.

What is claimed is:

1. A load balancing method in a system comprising a plurality of computers for processing transaction processing requests originating from a plurality of terminals, comprising steps of:
   a) estimating load states of respective ones of the plurality of computers;
   b) determining estimated elongation rates of processing time for respective ones of the plurality of computers based on the estimated load states, the estimated elongation rates being estimates of a ratio of job processing response time, including queuing time, to total processing time;
   c) calculating load indexes of respective ones of the plurality of computers based on the estimated elongation rates; and
   d) determining load distribution among the plurality of computers based on the load indexes;
   wherein the step (a) comprises the steps of:
   a.1) measuring load data of each of the plurality of computers at constant intervals; and
   a.2) estimating a load state of each of the plurality of computers based on the load data;

wherein,
in the step (a), a current number of in-process transactions in each of the plurality of computers is measured in response to start and termination of transaction processing at each of the plurality of computers,
in the step (b), an estimated elongation rate of processing time for each of the plurality of computers is determined based on the estimated current load state and the current number of in-process transactions in the computer; and
wherein the step (b) comprises the steps of:
b.1) correcting the estimated load states using current numbers of in-process transactions for respective ones of the plurality of computers to produce corrected estimated load states; and
b.2) determining said estimated elongation rates of processing time for respective ones of the plurality of computers based on the corrected estimated current load states.

2. The load balancing method according to claim 1, wherein the steps (a) through (d) are sequentially performed when a transaction processing request has been received from a terminal,
wherein, in the step (d), one of the plurality of computers is selected based on the load indexes as an execution computer processing the transaction processing request.

3. The load balancing method according to claim 1, wherein, in the step (a.1), a number of in-process transactions and a number of job processing processes staying in a CPU system of the computer are measured as the load data measured at constant intervals.

4. The load balancing method according to claim 1, wherein, in the step (a.1), a number of in-process transactions and a CPU utilization of the computer are measured as the load data measured at constant intervals.

5. The load balancing method according to claim 1, wherein, in the step (c), an estimated elongation rate is used as a load index of each of the plurality of computers.

6. The load balancing method according to claim 1, wherein, in the step (c), an estimated elongation rate is one of a before-scheduling estimated elongation rate and an after-scheduling estimated elongation rate,
wherein the before-scheduling estimated elongation rate is an estimated elongation rate calculated from a corresponding estimated load state before the transaction processing request is allocated to respective ones of the plurality of computers, and
the after-scheduling estimated elongation rate is an estimated elongation rate calculated from a corresponding estimated load state after the transaction processing request is allocated to respective ones of the plurality of computers.

7. The load balancing method according to claim 6, wherein the step (c) comprises the steps of:
c.1) multiplying the estimated elongation rate of each of the plurality of computers by a current number of in-process transactions in the computer to produce a total estimated elongation rate of the computer; and
c.2) determining the total estimated elongation rate as a load index of the computer.

8. The load balancing method according to claim 6, wherein the step (c) comprises the steps of:
c.1) multiplying the estimated elongation rate of each of the plurality of computers by a current number of in-process transactions in the computer to produce a total estimated elongation rate of the computer;
c.2) calculating a total estimated elongation rate difference between an after-scheduling total estimated elongation rate and a before-scheduling total estimated elongation rate of each of the plurality of computers; and
c.3) determining the total estimated elongation rate difference as a load index of the computer.

9. A load balancing system comprising:
a plurality of terminals, each of said plurality of terminals being adapted to originate a transaction processing request;
a plurality of computers, each of said plurality of computers being adapted to process a plurality of transaction processing requests originating from a plurality of terminals in parallel;
a load estimator for estimating load states of respective ones of the plurality of computers;
a load data memory for storing the estimated load states; and
an execution computer selector for selecting one of the plurality of computers as an execution computer to be put in charge of processing a transaction processing request based on load indexes of respective ones of the plurality of computers, wherein the load indexes are calculated from estimated elongation rates of processing time for respective ones of the plurality of computers, wherein the estimated elongation rates are determined based on the estimated load states and are estimates of a ratio of job processing response time, including queuing time, to total processing time;
wherein the load estimator measures load data of each of the plurality of computers at constant intervals and estimates a load state of each of the plurality of computers based on the load data;
wherein the load estimator measures a current number of in-process transactions in each of the plurality of computers in response to start and termination of transaction processing at each of the plurality of computers;
wherein the execution computer selector determines an estimated elongation rate of processing time for each of the plurality of computers based on the estimated current load state and the current number of in-process transactions in the computer; and
wherein the execution computer selector corrects the estimated load states using the current numbers of in-process transactions for respective ones of the plurality of computers to produce corrected estimated load states, and determines estimated elongation rates of processing time for respective ones of the plurality of computers based on the corrected estimated current load states.

10. The load balancing system according to claim 9, wherein the execution computer selector is started up when a transaction processing request has been received from a terminal and then selects one of the plurality of computers based on the load indexes as an execution computer processing the transaction processing request.

11. The load balancing system according to claim 9, wherein the load estimator measures a number of in-process transactions and a number of job processing processes staying in a CPU system of the computer as the load data measured at constant intervals.

12. The load balancing system according to claim 9, wherein the load estimator measures a number of in-process transactions and a CPU utilization of the computer as the load data measured at constant intervals.

13. The load balancing system according to claim 9, wherein the execution computer selector uses an estimated elongation rate as a load index of each of the plurality of computers.

14. The load balancing system according to claim 9, wherein an estimated elongation rate is one of a before-scheduling estimated elongation rate and an after-scheduling estimated elongation rate,
   wherein the before-scheduling estimated elongation rate is an estimated elongation rate calculated from a corresponding estimated load state before the transaction processing request is allocated to respective ones of the plurality of computers, and
   the after-scheduling estimated elongation rate is an estimated elongation rate calculated from a corresponding estimated load state after the transaction processing request is allocated to respective ones of the plurality of computers.

15. The load balancing system according to claim 14, wherein the execution computer selector multiplies the estimated elongation rate of each of the plurality of computers by a current number of in-process transactions in the computer to produce a total estimated elongation rate of the computer, and determines the total estimated elongation rate as a load index of the computer.

16. The load balancing system according to claim 14, wherein the execution computer selector multiplies the estimated elongation rate of each of the plurality of computers by a current number of in-process transactions in the computer to produce a total estimated elongation rate of the computer, calculates a total estimated elongation rate difference between an after-scheduling total estimated elongation rate and a before-scheduling total estimated elongation rate of each of the plurality of computers, and determines the total estimated elongation rate difference as a load index of the computer.

17. The load balancing system according to claim 9, further comprising:
   a control node connected between the terminals and the plurality of computers, wherein the control node includes the load estimator, the load data memory, and the execution computer selector.

18. The load balancing system according to claim 9, further comprising:
   a switching device connecting the plurality of computers to each other,
   wherein each of the plurality of computers includes the load estimator, the load data memory, and the execution computer selector, wherein an estimated load state estimated at a computer is transferred to all other computers through the switching device so that the load state memory of each of the plurality of computers stores same load state data.

19. The load balancing system according to claim 9, further comprising:
   a switching device connecting the plurality of computers to each other, the switching device including the load data memory which is shared among the plurality of computers,
   wherein each of the plurality of computers includes the load estimator and the execution computer selector, wherein an estimated load state estimated at a computer is transferred to the switching device to be stored in the load state memory.

20. A load balancing system according to claim 9, wherein the execution computer selector selects a computer to which the execution computer selector belongs when the load index of the computer is smaller than a value obtained by multiplying a minimum load index among the plurality of computers by a predetermined factor greater than 1.

21. A load balancing system comprising:
   a plurality of terminals, each of said plurality of terminals being adapted to originate a transaction processing request;
   a plurality of computers, each of said plurality of computers being adapted to process a plurality of transaction processing requests originating from a plurality of terminals in parallel;
   a load estimator for estimating load states of respective ones of the plurality of computers;
   a load data memory for storing the estimated load states; and
   an execution computer selector for selecting one of the plurality of computers as an execution computer to be nut in charge of processing a transaction processing request based on load indexes of respective ones of the plurality of computers, wherein the load indexes are calculated from estimated elongation rates of processing time for respective ones of the plurality of computers, wherein the estimated elongation rates are determined based on the estimated load states and are estimates of a ratio of job processing response time, including queuing time, to total processing time;
   wherein the load estimator measures load data of each of the plurality of computers at constant intervals and estimates a load state of each of the plurality of computers based on the load data;
   wherein the load estimator measures a current number of in-process transactions in each of the plurality of computers in response to start and termination of transaction processing at each of the plurality of computers;
   wherein the execution computer selector determines an estimated elongation rate of processing time for each of the plurality of computers based on the estimated current load state and the current number of in-process transactions in the computer;
   wherein the load estimator measures load data of each of the plurality of computers at constant intervals to produce a sequence of load data, and estimates a current load state of each of the plurality of computers based on the sequence of load data; and
   wherein the execution computer selector corrects the estimated load states using the current numbers of in-process transactions for respective ones of the plurality of computers to produce corrected estimated load states, and determines estimated elongation rates of processing time for respective ones of the plurality of computers based on the corrected estimated current load states.

22. A load balancing system comprising;
   a plurality of terminals, each of said plurality of terminals being adapted to originate a transaction processing request;
   a plurality of computers, each of said plurality of computers being adapted to process a plurality of transaction processing requests originating from a plurality of terminals in parallel;
   a load estimator for estimating load states of respective ones of the plurality of computers;
   a load data memory for storing the estimated load states;
   an execution computer selector for selecting one of the plurality of computers as an execution computer to be put in charge of processing a transaction processing request based on load indexes of respective ones of the plurality of computers, wherein the load indexes are calculated from estimated elongation rates of processing time for respective ones of the plurality of computers, wherein the estimated elongation rates are determined based on the estimated load states and are estimates of a ratio of job processing response time, including queuing time, to total processing time; and a switching device connecting the plurality of computers to each other, wherein each of the plurality of computers includes the load estimator, the load data memory, and the execution computer selector, wherein an estimated load state estimated at a computer is transferred to all other computers through the switching device so that the load state memory of each of the plurality of computers stores same load state data; and wherein the execution computer selector selects a computer to which the execution computer selector belongs when the load index of the computer is smaller than a value obtained by multiplying a minimum load index among the plurality of computers by a predetermined factor greater than 1.

23. A load balancing system comprising:

a plurality of terminals, each of which originates said plurality of terminals being adapted to originate a transaction processing request;

a plurality of computers, each of which processes said plurality of computers being adapted to process a plurality of transaction processing requests originating from a plurality of terminals in parallel;

a load estimator for estimating load states of respective ones of the plurality of computers;

a load data memory for storing the estimated load states; and an execution computer selector for selecting one of the plurality of computers as an execution computer to be put in charge of processing a transaction processing request based on load indexes of respective ones of the plurality of computers, wherein the load indexes are calculated from estimated elongation rates of processing time for respective ones of the plurality of computers, wherein the estimated elongation rates are determined based on the estimated load states;

the system further comprising:

an interim control node connected between the plurality of terminals and the plurality of computers, wherein the interim control node includes an interim execution computer selector for selecting one of the plurality of computers according to a predetermined rule; and a switching device connecting the plurality of computers to each other, wherein each of the plurality of computers includes the load estimator, the load data memory, and the execution computer selector, wherein an estimated load state estimated at a computer is transferred to all other computers through the switching device so that the load state memory of each of the plurality of computers stores same load state data, and wherein the execution computer selector selects a computer to which the execution computer selector belongs when the load index of the computer is smaller than a value obtained by multiplying a minimum load index among the plurality of computers by a predetermined factor greater than 1.

24. A load balancing method in a system comprising a plurality of computers for processing transaction processing requests originating from a plurality of terminals, comprising steps of:

a) estimating load states of respective ones of the plurality of computers;

b) determining estimated elongation rates of processing time for respective ones of the plurality of computers based on the estimated load states;

c) calculating load indexes of respective ones of the plurality of computers based on the estimated elongation rates; and d) determining load distribution among the plurality of computers based on the load indexes, wherein the estimated elongation rate E is a ratio of a processing time required for a job processing process to a net processing time, wherein the estimated elongation rate E is obtained by the following equation:

$$E=X/(X-P \cdot P), \text{ when } P<N, =N+1.0, \text{ when } P \square N,$$

where $X=N \cdot (P+1)$, N is the number of in-process transactions in a computer and P is the number of transaction processes in a CPU system of the computer.

25. A load balancing method in a system comprising a plurality of computers for processing transaction processing requests originating from a plurality of terminals, comprising steps of:

a) estimating load states of respective ones of the plurality of computers;

b) determining estimated elongation rates of processing time for respective ones of the plurality of computers based on the estimated load states;

c) calculating load indexes of respective ones of the plurality of computers based on the estimated elongation rates; and d) determining load distribution among the plurality of computers based on the load indexes, wherein the estimated elongation rate E is obtained by the following equation:

$$E=N(1-R)/(N(1-R)-R \cdot R)$$

where N is a number of in-process transactions in a computer and R is a CPU utilization.

26. A load balancing method in a system comprising an interim load balancing device connecting a plurality of terminals and a plurality of execution computers, comprising steps of:

at the interim load balancing device, a) setting a predetermined distribution scheme;

b) when receiving a transaction processing request from a terminal, selecting an interim destination execution computer from the plurality of execution computers according to the predetermined distribution scheme;

c) sending the transaction processing request to the interim destination execution computer;

at each of the execution computers, d) estimating a load state of the execution computer based on load data measured at regular intervals including a number of in-process transactions and one of a CPU utilization and a number of job processing processes staying in a CPU system of the execution computer;

e) storing the load state of the execution computer and a load state received from another execution computer in a load state memory;

f) transferring the load state of the execution computer to all other execution computers;

g) when receiving the transaction processing request from the interim load balancing device, determining estimated elongation rates of processing time for respective ones of the plurality of execution computers based on the load states stored in the load state memory;

h) calculating load indexes of respective ones of the plurality of execution computers from the estimated elongation rates;

said method further comprising the steps of:

i) determining based on the load indexes whether the transaction processing request should be processed by the interim destination execution computer or transferred to another execution computer;

j) when it is determined that the transaction processing request should be transferred to another execution computer, determining in said interim destination execution computer, a final destination computer among the plurality of execution computers based on the load indexes to transfer it to the final destination computer; and k) when it is determined in said interim destination execution computer, that the transaction processing request should be processed by the interim destination execution computer, processing the transaction processing request in said interim destination execution computer.

27. A load balancing method according to claim 26, wherein, in the step (a), the predetermined distribution scheme is a static distribution method such that the plurality of terminals are previously divided into a plurality of groups and said interim destination execution computer is determined depending on which one of the plurality of groups a request originating terminal belongs to.

28. A load balancing method according to claim 26, wherein, in the step (a), the predetermined distribution scheme is a static round distribution method such that the plurality of execution computers are sequentially and repeatedly selected as an interim destination execution computer in the arrival order.

29. A load balancing method according to claim 26, wherein the step (a) comprises the steps of:

a.1) receiving load data from each of the plurality of execution computers at regular intervals, the load data including a number of in-process transactions and one of a CPU utilization and a number of job processing processes staying in a CPU system of the execution computer;

a.2) determining the predetermined distribution scheme based on the load data so that a transaction processing load is balanced among the plurality of execution computers.

30. A computer readable recording medium for storing computer executable software comprising a first computer program for instructing a first computer of an interim load balancing device to distribute transaction processing requests originating from a plurality of terminals to a plurality of execution computers; and a second computer program for instructing each of the plurality of execution computers to balance a transaction processing load among the plurality of execution computers, wherein the first computer program comprises the steps of:

a) setting a predetermined distribution scheme;

b) when receiving a transaction processing request from a terminal, determining an interim execution computer according to the predetermined distribution scheme; and c) sending the transaction processing request to the interim execution computer, wherein the second computer program comprises the steps of:

d) estimating a load state of the execution computer based on load data measured at regular intervals including a number of in-process transactions and one of a CPU utilization and a number of job processing processes staying in a CPU system of the execution computer;

e) storing the load state of the execution computer and a load state received from another execution computer in a load state memory;

f) transferring the load state of the execution computer to all other execution computers;

g) when receiving the transaction processing request from the interim load balancing device, determining estimated elongation rates of processing time for respective ones of the plurality of execution computers based on the load states stored in the load state memory;

h) calculating load indexes of respective ones of the plurality of execution computers from the estimated elongation rates;

i) determining based on the load indexes whether the transaction processing request should be processed by the execution computer or transferred to another execution computer;

j) when it is determined that the transaction processing request should be transferred to another execution computer, determining a final destination computer among the plurality of execution computers based on the load indexes to transfer it to the final destination computer; and k) when it is determined that the transaction processing request should be processed by the execution computer, processing the transaction processing request.

* * * * *